United States Patent
Nagai (10) Patent No.: US 7,530,922 B2
(45) Date of Patent: May 12, 2009

(54) ENGINE CONTROL APPARATUS AND ENGINE CONTROL METHOD

(75) Inventor: Masakatsu Nagai, Hiratsuka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 384 days.

(21) Appl. No.: 11/596,038

(22) PCT Filed: May 8, 2006

(86) PCT No.: PCT/IB2006/001224

§ 371 (c)(1),
(2), (4) Date: Nov. 9, 2006

(87) PCT Pub. No.: WO2006/120549

PCT Pub. Date: Nov. 16, 2006

(65) Prior Publication Data

US 2008/0287254 A1     Nov. 20, 2008

(30) Foreign Application Priority Data

May 10, 2005   (JP) .............................. 2005-137554

(51) Int. Cl.
*F16H 59/74* (2006.01)
(52) U.S. Cl. ...................................... 477/102; 477/105
(58) Field of Classification Search ................ 477/101, 477/102, 105, 106, 107
See application file for complete search history.

(56) References Cited

U.S. PATENT DOCUMENTS

| 5,390,491 | A | * | 2/1995 | Suzumura et al. ............. 60/276 |
| 5,876,301 | A | | 3/1999 | Tabata et al. |
| 6,708,668 | B2 | * | 3/2004 | Yoshida et al. ............... 123/295 |
| 6,732,504 | B2 | * | 5/2004 | Majima et al. ................ 60/284 |
| 2002/0086771 | A1 | | 7/2002 | Abe |

FOREIGN PATENT DOCUMENTS

| JP | 04-067058 B2 | 10/1992 |
| JP | 07-293682 A | 11/1995 |
| JP | 09-125998 A | 5/1997 |
| JP | 2002-188476 A | 7/2002 |
| JP | 2003-120801 A | 4/2003 |
| JP | 2003-139234 A | 5/2003 |
| JP | 2004-084820 A | 3/2004 |
| JP | 2005-030252 A | 2/2005 |

* cited by examiner

*Primary Examiner*—Ha D. Ho
(74) *Attorney, Agent, or Firm*—Kenyon & Kenyon LLP

(57) ABSTRACT

An engine control apparatus which performs torque-down control during shifting is structured so as to determine a retard rate from an MBT ignition timing which will achieve a target torque-down rate, and determine a target ignition timing based on that retard rate. The retard rate that achieves a given torque-down rate changes substantially linearly with respect to the MBT ignition timing, so that change is easy to predict. Accordingly, the structure and configuring and the like of the engine control apparatus are simplified.

12 Claims, 6 Drawing Sheets

INTAKE AIR AMOUNT

|  | 0 | 10 | 15 | · · · · | 80 | 85 | 90 | · · · · |
|---|---|---|---|---|---|---|---|---|
| 800 | · |  |  |  |  |  |  | · · · · |
| 1000 | · |  |  |  |  |  |  | · · · · |
| 1200 | · |  |  |  |  |  |  |  |
| ⋮ |  |  |  | (S20) CATALYTIC CONVERTER TEMPERATURE | | | |  |
| ⋮ |  |  |  | (S30) MBT IGNITION TIMING (CRANK ANGLE) | | | |  |
| 6000 | · |  |  | (S40) MBT [TORQUE] | | | |  |
| 6200 | · |  |  | (S40) FRICTION TORQUE (TEMPERATURE UNCORRECTED) | | | | · · · · |
| 6400 | · |  |  |  |  |  |  | · · · · |
| ⋮ | · |  |  |  |  |  |  | · · · · |

ENGINE SPEED

FIG. 3B

ENGINE LUBRICATION OIL TEMPERATURE

|  | −40 | −20 | 0 | · · · · | 80 | 90 |
|---|---|---|---|---|---|---|
| TORQUE | · |  |  |  |  | 0 |

(S40) FRICTION TORQUE OIL TEMPERATURE CORRECTION TERM

FIG. 3C

TARGET TORQUE-DOWN RATE

|  | 0 | 10 | 15 | · · · · | 90 | 100 |
|---|---|---|---|---|---|---|
| 10 | · | · | · | · · · · | · | · |
| ⋮ |  |  |  | (S50) TARGET RETARD RATE | | |
| 30 |  |  |  | | | |
| ⋮ |  |  |  | | | |
| 50 | · | · | · | · · · · | · | · |

MBT IGNITION TIMING

ENGINE CONTROL APPARATUS AND ENGINE CONTROL METHOD

INCORPORATION BY REFERENCE

This is a 371 national phase application of PCT/IB2006/001224 filed 8 May 2006, claiming priority to Japanese Patent Application No. 2005-137554 filed 5 Oct. 2005, the contents of which are incorporated herein by reference.

BACKGROUND OF THE INVENTION

1. Field of the Invention

The invention relates to a control apparatus and control method for an engine in which an output shaft is connected to an automatic transmission (or a manual transmission with an automatic clutch). More particularly, the invention relates to a control apparatus and control method which performs torque-down control during shifting in order to suppress shift shock. While the engine control apparatus and engine control method according to this invention are preferably used for controlling an engine for a vehicle such as an automobile, it is to be understood that they may also be used for controlling an engine for various kinds of machinery and apparatuses other than a vehicle.

2. Description of the Related Art

Transient sudden fluctuations in output torque of a transmission, i.e., shift shock, is known to occur when the speed of an automatic transmission that is connected to an output shaft of the engine is changed (i.e., during shifting). Simply put, shift shock is mainly produced by rotary inertia torque of the engine when the engine speed changes are added on to the output torque of the engine (i.e., torque generated by the combustion of fuel) and the resultant torque is then transmitted to an input shaft of the transmission during the shifting of speeds. One idea that has been proposed to avoid shift shock is to cancel out the effects of engine rotary inertia by temporarily reducing the output torque from the engine in response to a request by the driver to shift speeds or an automatic request to shift speeds from a transmission control apparatus. Control which reduces the output torque from the engine in this way is referred to as "torque-down control during shifting". Reducing the output torque from the engine is performed, for example, by delaying (i.e., retarding) the ignition timing of the engine (see Japanese Patent Publication No. 4-67058, Japanese Patent Application Publication No. JP-A-7-293682, and Japanese Patent Application Publication No. JP-A-2002-188476), or by reducing the opening amount of the throttle (see Japanese Patent Application Publication No. JP-A-9-125998).

Figure 4A:
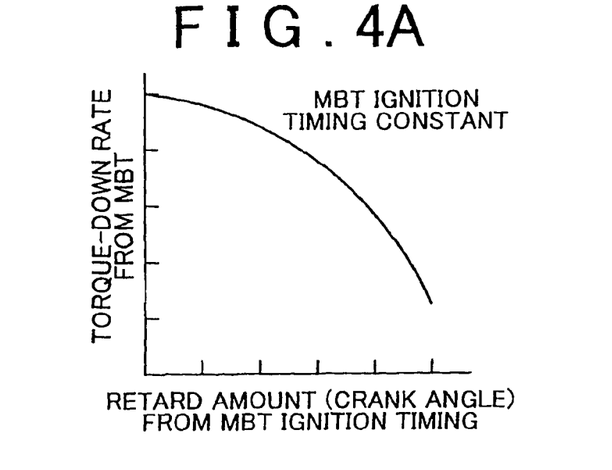
FIG. 4A is a graph showing the relationship between the torque-down rate in a given MBT ignition timing and the retard amount from the MBT ignition timing.

When performing torque-down control by retarding the ignition timing, it is known that if an MBT (Minimum advance for Best Torque) ignition timing of the engine (i.e., the ignition timing that generates the most torque in the current engine operating state) is determined, then a torque-down rate (i.e., the ratio of torque reduced after the retard to the torque generated in the engine at the MBT ignition timing (i.e., the maximum amount of torque able to be generated)) is primarily determined by the retard amount measured from the MBT ignition timing, regardless of the other operating states (see FIG. 4A), as described in Japanese Patent Application Publication No. JP-A-2002-188476. Accordingly, if the MBT ignition timing and the required torque-down rate (or target torque-down rate) are provided, the retard amount that will achieve that required torque-down rate can be obtained, which enables the target ignition timing to be determined.

During actual operation of an engine, the MBT ignition timing changes depending on the operating state of the engine. Therefore, during this control, the retard amounts that provide the various torque-down rates when there are various MBT ignition timings (crank angles) are obtained through experimentation beforehand, and a two-dimensional data map or table of retard amounts is prepared in advance with the MBT ignition timing and the torque-down rate as parameters. The target retard amount that provides the required torque-down rate (i.e., the torque-down rate necessary to avoid shift shock) is determined using this two-dimensional data table that was prepared in advance (the target ignition timing is set to a timing that corresponds to the target retard amount). That is, even if the operating state of the engine changes, as long as the MBT ignition timing for the current engine operating state is provided, then the target retard amount for achieving the required torque-down rate, i.e., the appropriate ignition timing, can be determined from the relationship between the torque-down rate and the retard amount obtained beforehand through experimentation, such that the amount of torque output from the engine can be precisely controlled.

Japanese Patent Application Publication No. JP-A-2002-188476 also points out that torque lost due to friction between structural elements of the engine (i.e., friction torque) should be taken into account in order to more precisely execute torque-down control. When it is necessary to adjust the torque transmitted from the output shaft of the engine to the transmission (i.e., the net engine torque) in order to avoid shift shock, the torque generated by the combustion of fuel in the engine can be adjusted by controlling the ignition timing or the opening amount of the throttle. In an actual engine, a portion of all of the rotary energy generated by the combustion of fuel is lost due to friction between structural elements of the engine such that the net engine torque is less than the torque generated by the combustion of fuel. As a result, in this control, the required torque-down rate or the target torque-down rate is determined taking that friction torque amount into account. One example of a method for calculating the friction torque of the engine disclosed in Japanese Patent Application Publication No. JP-A-2003-120801 estimates the friction torque from the engine intake air pressure and the engine speed. Another method disclosed in Japanese Patent Application Publication No. JP-A-2005-30252 estimates the value of the friction torque from the engine coolant temperature. Furthermore, relating to torque-down control of an engine during shifting, Japanese Patent Application Publication No. JP-A-2004-84820 describes technology in which shift control of the transmission itself is performed be referencing the difference between the actual engine output torque and a target value of that engine output torque. Japanese Patent Application Publication No. JP-A-2005-30252 also describes technology which performs shift control using the hydraulic pressure and temperature of the hydraulic fluid in a transmission to calculate the torque component due to friction between structural elements in a transmission.

Figure 4B:
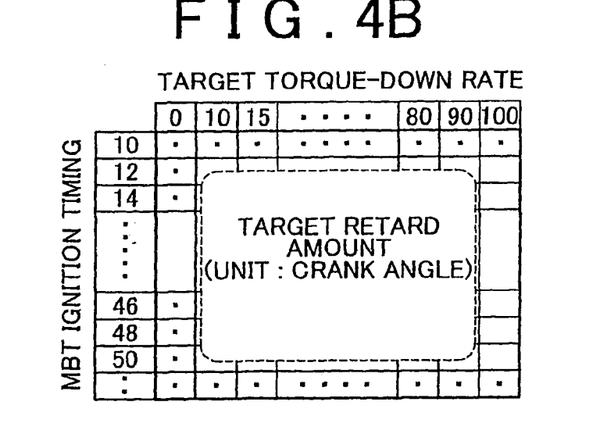
FIG. 4B is a two-dimensional data table of retard amounts with the torque-down rate and the MBT ignition timing as variables.
Figure 4C:
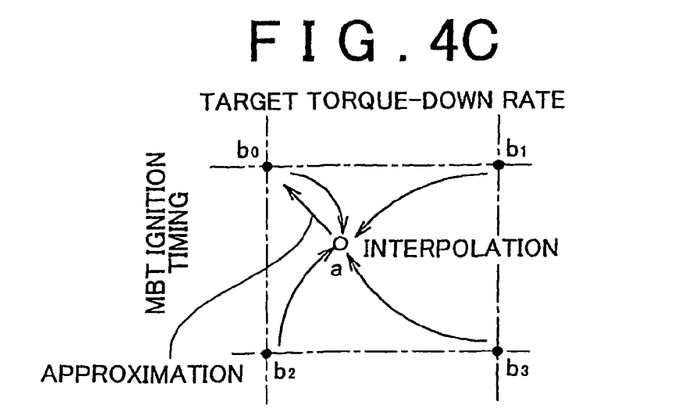
FIG. 4C is a view showing the relationship between data provided by the table in FIG. 4B and the data required for the actual control.

When performing torque-down control by retarding the ignition timing, the torque-down rate when the MBT ignition timing is at a given crank angle is primarily determined by the retard amount, as described above. Therefore, the target retard amount is determined using a two-dimensional data table which has limited retard amount data obtained through experimentation beforehand with the MBT ignition timing and the required torque-down rate as two variables, as shown in FIG. 4B. In this two-dimensional data table, a state specified at predetermined intervals of time, i.e., data (the retard amount) at a data point, is provided by the two variables (i.e., the MBT ignition timing and the required torque-down rate), as is well known. During actual control, if the values of the current MBT ignition timing and the required torque-down rate do not match the respective variable values for which the retard amount data is obtained in advance (which is often the case), i.e., if data point a in the two-dimensional data table specified by the actual MBT ignition timing and the required torque-down rate does not match any of the data points $b_0$ to $b_3$ for which the retard amount data is obtained in advance, as shown in FIG. 4C, then either the retard amount data at the closest data point provided in the table (such as $b_0$) is selected or the target retard amount is determined by interpolation using the retard amount data at a plurality of lattice points $b_0$ to $b_3$ that are close.

Figure 5A:
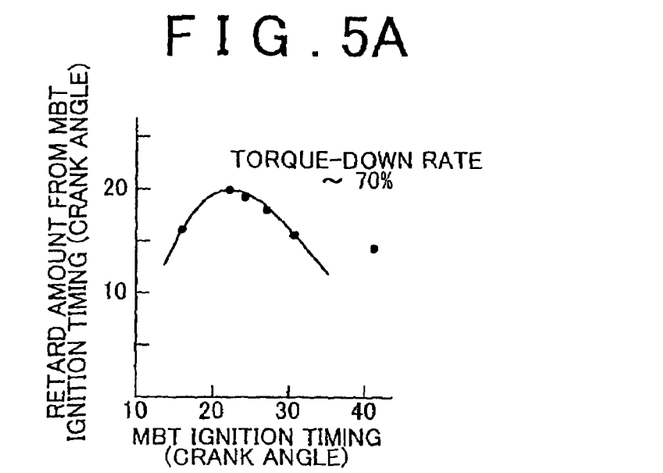
FIG. 5A is a graph showing the relationship between the retard amount and the MBT ignition timing when the torque-down rate is constant.

In order to accurately determine the target retard amount, however, as shown in FIG. 4B, the amount of retard amount data to be stored in the two-dimensional data table of retard amounts with the MBT ignition timing and the required torque-down rate as the variables is enormous. And because of this, an enormous amount of labor would be spent on experimentation in order to prepare the table. If the retard amount data of the data point that is closest to the data point specified by the current MBT ignition timing and the required torque-down rate is made the target data mount, an extremely large amount of retard amount data is necessary to reduce the error. Further, even if the target value is determined by interpolating the retard amount data, the change in the retard amount that provides a given required torque-down rate with respect to the change in the MBT ignition timing is non-linear, as shown in FIG. 5A (i.e., the retard amount changes up and down). Therefore, in order to accurately determine the target retard amount by linear interpolation of the retard amount data, it is necessary to obtain detailed retard amount data for the MBT ignition timing on a level at which changes in the retard amount data between adjacent data points are considered substantially linear when preparing the table. That is, in this case as well, it is necessary to obtain an extremely large amount of retard amount data through experimentation beforehand. As the amount of data that needs to be obtained through experimentation in advance increases, so too does the cost of memory to store that data, or the cost of configuring the memory, including the expenses for the experimentation to obtain the data.

Also, as described above, while performing torque-down control during shifting, the ignition timing and the intake air amount and the like change, which result in a fluctuation in other operating states of the engine such as the engine speed, the MBT ignition timing, the air-fuel ratio, the engine exhaust gas temperature and the like. In order to control the engine output torque more accurately and appropriately, it is preferable that the engine control apparatus also be able to appropriately (more appropriately than the apparatuses disclosed in the related art described above) handle changes in the engine operating states during torque-down control.

DISCLOSURE OF THE INVENTION

It is therefore an object of this invention to provide an engine control apparatus and an engine control method which performs torque-down control during shifting and which is structured such that ignition timing control for reducing engine torque is able to be performed accurately while greatly reducing the amount of labor involved in making the necessary configurations and the like for that control.

Figure 5B:
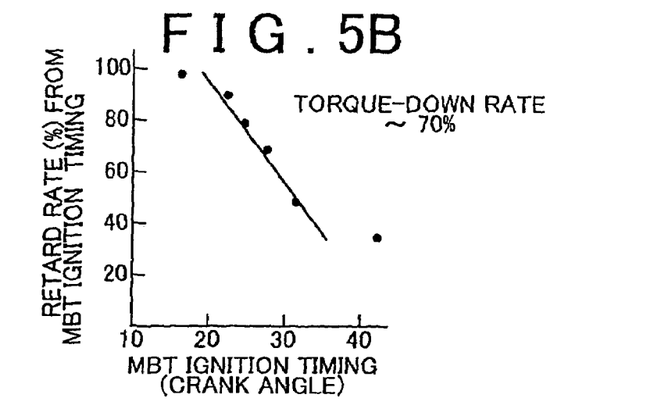
FIG. 5B is a graph showing the relationship between the retard amount and the MBT ignition timing when the torque-down rate is constant. The points in the graph are actually measured values and the solid line is a line schematically showing the change in the data.

In the process of studying the relationship between torque-down rate and ignition timing, the inventor has found that with respect to a change in the MBT ignition timing, a retard rate that provides a given torque-down rate, i.e., the retard amount/MBT ignition timing (crank angle) [the quotient of the retard amount from the MBT ignition timing divided by the crank angle at the MBT ignition timing measured from top-dead-center of the crankshaft], changes substantially linearly (or the retard rate monotonically decreases with respect to the MBT ignition timing), as shown in FIG. 5B. Further, when the retard rate is constant, the torque-down rate changes substantially linearly with respect to a change in the MBT ignition timing.

The invention thus provides a novel engine control apparatus which performs torque-down control during shifting using the newly discovered characteristic of the change in the retard rate with respect to the MBT ignition timing. An engine control apparatus according to a first aspect of the invention is an engine control apparatus which controls output torque from an engine in which an output shaft is connected to an automatic transmission or a manual transmission with an automatic clutch, and reduces that output torque when a speed of the transmission is changed, and which includes: means for determining, based on an operating state of the engine, an MBT ignition timing that generates maximum torque in that operating state of the engine; means for determining a target torque-down rate which is a ratio of a target torque of the engine when a speed of the transmission is changed to the maximum torque; means for determining a target ignition timing for achieving the target torque-down rate based on the MBT ignition timing; and ignition controlling means for executing ignition at the target ignition timing. The means for determining the target ignition timing determines a target retard rate from the MBT ignition timing which will achieve the target torque-down rate and determines the target ignition timing based on the target retard rate.

In the engine control apparatus according to the first aspect described above, the target retard rate, not the target retard amount, is determined from the MBT ignition timing and the target torque-down rate, and a target ignition timing that corresponds to that target retard rate is then determined. As described above already, the retard amount used in the prior and existing torque-down control during shifting changes non-linearly when the MBT ignition timing changes when trying to achieve a give torque-down rate. Therefore, in order to precisely (accurately) obtain the target retard amount, it was necessary to prepare an enormous amount of experimental data in advance. In contrast to this, when obtaining the target retard rate from the MBT ignition timing and the target torque-down rate, it is now known that the target retard rate changes substantially linearly (or monotonically) so even if the MBT ignition timing changes, the target retard rate can still be easily obtained with accuracy, thereby making it possible to determine the appropriate target ignition timing.

In the foregoing engine control apparatus, the target retard rate may be determined using a two-dimensional data table with the MBT ignition timing and the target torque-down rate as variables. In this case, the data values in the two-dimensional data table are retard rates.

In the prior and existing two-dimensional data table of retard amounts, the change in the torque-down rate provided by a given retard amount is non-linear with respect to the MBT ignition timing. The fact that this torque-down rate rises and falls makes it difficult to predict, in the process of gathering experimental data for the data table beforehand, just how the retard amount which provides a given torque-down rate will change when the MBT ignition timing changes. Thus, searching for test conditions that provide the necessary retard amount data in the control apparatus was not easy. However, because it is now understood that the target retard rate changes substantially linearly with respect to a change in the MBT ignition timing, and that at a given retard ratio the torque-down rate also changes substantially linearly with respect to the MBT ignition timing, as described above, this invention makes it extremely easy to search for the test conditions necessary for the control apparatus so that a table with the required accuracy can be prepared efficiently.

Further, in the control apparatus according to the invention, the target retard rate may be provided by linearly interpolating a value of a retard rate in the two-dimensional data table. As described above, the number of data in the two-dimensional data table is limited. Therefore, in order to obtain a more precise target value than the data value provided by the data point specified by the MBT ignition timing and the target torque-down rate in the two-dimensional data table, the target value is determined by interpolating the data values of a plurality of points specified by values that are close to the MBT ignition timing and the target torque-down rate obtained in the actual control. In interpolating the data values, if the manner of change in the data values is not evident, the data value that is to be the target is usually determined by linear interpolation. In this case, as described above already, in order to obtain the target value of the retard amount in which the data value in the table changes non-linearly with respect to the MBT ignition timing by linear interpolation with suitable accuracy, it is necessary to prepare considerably detailed data for the MBT ignition timing in the table. However, with the first aspect of the invention in which the values in the table are retard rates, the data value in the table changes substantially linearly with respect to the MBT ignition timing. Therefore, compared with the related art, it is possible to more precisely determine the target value by linear interpolation even if there is not a large number of data in the table. In other words, performing control using the retard rate enables the amount of data to be prepared beforehand to be drastically reduced compared with when the retard amount is used.

In the engine control apparatus according to the first aspect of the invention described above, the means for determining the target torque-down rate may include: means for estimating the maximum torque obtained by the combustion of fuel at the MBT ignition timing, means for estimating a friction torque of the engine, and means for determining the target torque-down rate based on the maximum torque, a target torque of torque reduction control when a speed of the transmission is changed (a target value of the reduced torque after control is performed), and the friction torque. With regard to this point, in order to accurately estimate the friction torque, the friction torque may be corrected based on a temperature of lubrication oil of the engine in the invention. Friction torque refers to the amount of torque, from the torque obtained by burning fuel, which is consumed by friction between elements of various parts of the engine. The friction force of the elements of various parts of the engine is affected by the temperature of those parts. Therefore, the friction torque that was estimated by the friction torque estimating means (the friction torque may usually be estimated from the engine speed and the intake air amount) can be more accurately corrected by referencing the temperature of the lubrication oil of the various parts where friction is generated between elements, rather than by referencing the engine coolant temperature as is done in the related art.

Moreover, the foregoing engine control apparatus according to the invention may further be provided with means for determining whether to execute a fuel increase control to avoid melting loss of a catalyst provided in an exhaust passage of the engine due to a rise in temperature of exhaust gas in the engine, and throttle controlling means for controlling an opening amount of an intake throttle of the engine. Also, when it is determined that the fuel increase control should be executed, ignition control by the ignition controlling means according to the target ignition timing may be prohibited, and the throttle controlling means may reduce the output torque of the engine by controlling the opening amount of the intake throttle.

Figure 5C:
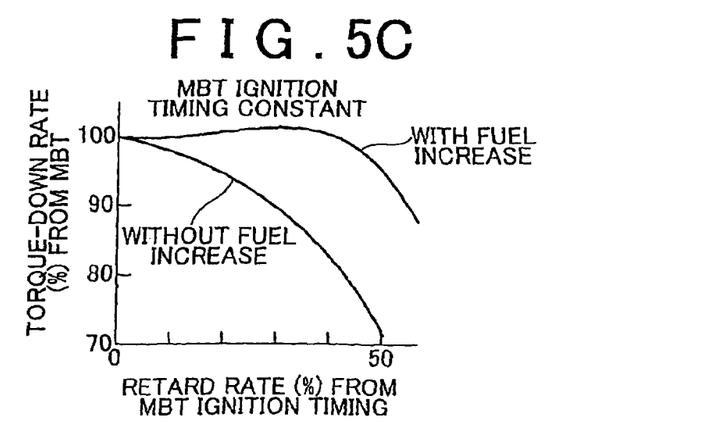
FIG. 5C is a graph showing the change in the torque-down rate at a given MBT ignition timing when OT fuel increase control is performed.

When retard control of the ignition timing is executed, the temperature of the engine exhaust gas typically rises. In this case, if the temperature of a catalyst provided in an exhaust passage of the engine continues to rise to the point at which melting loss may occur, fuel increase control (i.e., OT (overtemperature) fuel increase control; control to make the air-fuel ratio rich) is executed in order to lower the temperature of the exhaust gas. When this fuel increase control is executed, the torque-down rate then begins to rise. Actually, through testing by the inventor of the invention, is has become evident that the torque-down rate does not decrease when the retard rate is increased under a condition in which the OT fuel increase control can be executed, as shown in FIG. 5C. Accordingly, when it is determined that the OT fuel increase control should be executed when executing the torque-down control during shifting, ignition control is preferably prohibited. Instead, the throttle controlling means preferably reduces the output torque of the engine by controlling the opening amount of the intake throttle.

In the foregoing invention, the data in the two-dimensional data table having the MBT ignition timing and the target torque-down rate as variables are retard rates. It is to be understood, however, that based on the knowledge that the retard rate that provides a given constant torque-down rate changes substantially linearly with respect to a change in the MBT ignition timing, the data value may also be realized with the retard amount as long as there is interpolation of the data in the two-dimensional data table. That is, even if the data in the two-dimensional data table are retard amounts, as long as the target ignition timing is determined based on a value provided by linearly interpolating the values that are obtained by dividing the values of a plurality of retard amounts in the two-dimensional data table by respective crank angles of the corresponding MBT ignition timings, the ignition control can still be executed with accuracy similar to that obtained when the target ignition timing determined based on the target retard rate is obtained. Accordingly, it is to be understood that this case is also within the scope of the invention.

An engine control method according to a second aspect of the invention is an engine control method which controls output torque from an engine in which an output shaft is connected to an automatic transmission or a manual transmission with an automatic clutch, and reduces the output torque when a speed of the transmission is changed, and which includes the steps of: determining, based on an operating state of the engine, an MBT ignition timing that generates maximum torque in that operating state of the engine; determining a target torque-down rate which is a ratio of a target torque of the engine when a speed of the transmission is changed to the maximum torque; determining a target ignition timing for achieving the target torque-down rate based on the MBT ignition timing; and executing ignition at the target ignition timing. In determining the target ignition timing, a target retard rate from the MBT ignition timing which will achieve the target torque-down rate is determined and the target ignition timing is determined based on the target retard rate.

In the steps of the structure of the foregoing invention are mainly based on the discovery that the change in the retard rate which provides a given constant torque-down rate is substantially linear with respect to a change in the MBT ignition timing, and the torque-down rate changes substantially linearly with respect to a change in the MBT ignition timing if the retard rate is constant (the reason why the change in the retard rate is substantially linear with respect to a change in the MBT ignition timing while the change in the retard amount that provides a given constant torque-down rate is non-linear with respect to a change in the MBT ignition timing, is thought to be because the difference in combustion rate is reflected in the retard rate). The relationship between the MBT ignition timing, the torque-down rate, and the retard rate has become clear so by controlling the ignition timing based on the retard rate instead of the retard amount, the manner of change in the retard rate becomes much easier to predict than it is with the retard amount. Therefore, design or configuring of the engine control apparatus is extremely simple, which greatly reduces time, labor, and costs required to complete the engine control apparatus. Also, because the data is easier to gather, it is conceivable that the quality and accuracy of the gathered data will also improve.

More specifically, when using a two-dimensional data table, that table must be prepared for each individual engine because the characteristics, such as the displacement and type, of each engine differ. Accordingly, preparing the tables takes an extremely long time, requires a lot of labor, and is expensive. The engine control apparatus according to this invention which is structured based on the foregoing discovery, however, is expected to further reduce the time, labor, and costs involved in preparing the table. Further, even if values of the two-dimensional table are picked up with the look-up method by predetermined parameters, the number of data in the table can be drastically reduced compared with the related art because linear interpolation of the data is possible. As a result, the cost of the memory to store the data, or the cost of configuring the memory, including the expenses for experimentation to obtain data, can also be reduced.

Other objects and advantages of the invention will become evident from the following description of the preferred example embodiments of the invention.

DETAILED DESCRIPTION OF THE PREFERRED EMBODIMENTS

Hereinafter, the invention will be described in more detail in terms of several preferred embodiments with reference to the accompanying drawings. In the drawings, like reference characters denote like portions.

Figure 1:
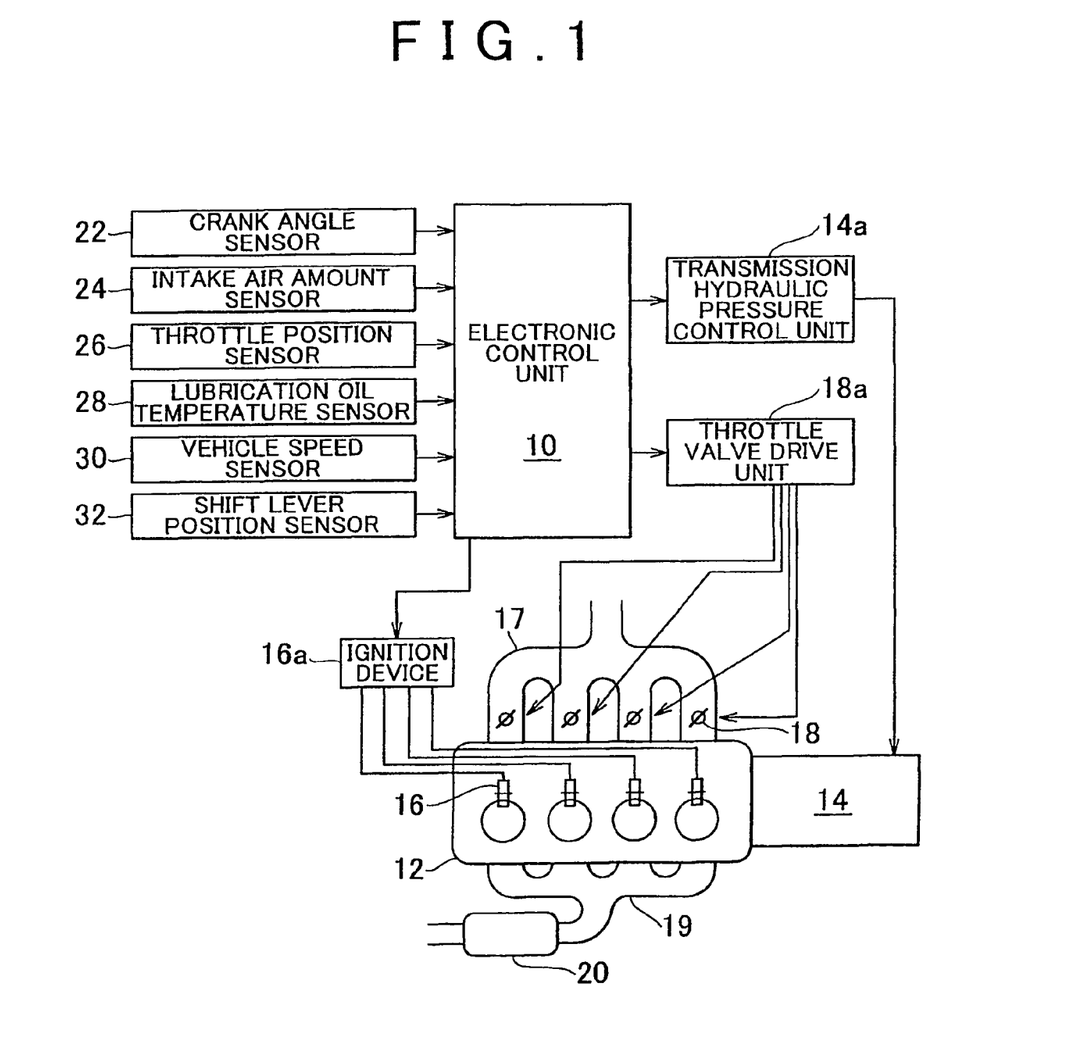
FIG. 1 is a representative view illustrating a control apparatus of an automatic transmission and an engine incorporating an engine control apparatus according to one example embodiment of the invention.

FIG. 1 is a representative view illustrating an engine drive system mounted in a vehicle that includes an electronic control unit 10 which incorporates an engine control apparatus according to a preferred example embodiment of the invention, an engine 12 which is controlled by this electronic control unit 10, an automatic transmission 14 that is connected to an output shaft of the engine 12 and also controlled by the electronic control unit 10, and other related equipment.

In FIG. 1, the engine 12 may be any type of multiple cylinder gasoline engine which is well known in the field. Each cylinder of the engine is provided with a spark plug 16 and an ignition device 16a that operates the spark plug 16. Throttle valves 18 are provided in an intake manifold 17. More specifically, in this example embodiment, the throttle valves 18 are independent throttle valves with one being provided in each cylinder, though it is to be understood that the invention is not limited to this. Except for when torque-down control during shifting according to the invention is executed, which will be described in detail below, the ignition timing of the ignition device 16a and the spark plug 16 and the opening amounts of the throttle valves 18 (which are operated by a throttle valve drive unit 18a) are controlled in the normal mode by the electronic control unit 10. Exhaust gas from the cylinders passes through a normal exhaust gas control catalytic converter 20 disposed midway in an exhaust system 19. Also, the engine 12 is provided with some type of lubrication system, not shown, for lubricating moving elements in the engine 12.

The automatic transmission 14 is a stepped transmission of a known type in which rotation of an output shaft of the automatic transmission 14 is transmitted via a differential gear unit to axles of driven wheels of the vehicle, not shown. In the normal mode, the electronic control unit 10 operates a hydraulic pressure control unit 14a in response to, for example, vehicle speed and engine load (throttle opening amount) to perform a gear change, i.e., to shift speeds. The transmission 14 may also be a semi-automatic clutch type transmission, i.e., a manual transmission with an automatic clutch in which the driver is able to select the speed.

The electronic control unit 10 functions both as an engine control unit which controls operation of the engine, including torque-down control during shifting according to the invention, and as a transmission control unit which controls operation of the automatic transmission 14. Alternatively, however, the engine control unit and the transmission control unit may be provided separately but able to communicate with one another. More specifically, although not shown, the electronic control unit 10 may include a drive circuit and microcomputer of a typical configuration which has a CPU, ROM, RAM, and an input/output port device all of which are connected together by a bidirectional common bus, for example. The electronic control unit 10 receives various signals, such as a crank angle signal from a crank angle sensor 22 of the engine 12, an intake air amount signal from an intake air amount sensor 24, a throttle opening amount signal from a throttle position sensor 26, an oil temperature signal from a lubrication oil temperature sensor 28 of a lubrication system, a vehicle speed signal from a vehicle speed sensor 30, a shift lever position signal from a shift lever position sensor 32, and other signals from various other sensors necessary to control the engine and the transmission. The engine speed is calculated from the crank angle signal. Also, the intake air amount may also be calculated indirectly from the engine speed and the throttle opening amount and the like instead of from the signal from the intake air amount sensor 24. Further, the vehicle speed may also be calculated from the wheel speed of each wheel of the vehicle.

As described above, when it has been determined that the transmission should shift speeds based on the data indicative of the engine speed and the engine load, or the shift lever position signal, the electronic control unit 10 responds by executing torque-down control during shifting instead of the normal engine output torque control. More specifically, in this example embodiment, execution of the torque-down control during shifting is done through retard control of the ignition timing based on a target retard rate that was determined with the MBT ignition timing and the target torque-down rate as variables. However, if the catalyst temperature is high and there is a possibility that OT fuel increase control may be executed by executing the retard control of the ignition timing or if the OT fuel increase control is already being executed, then torque-down control is executed by controlling the throttle opening amount.

Figure 2:
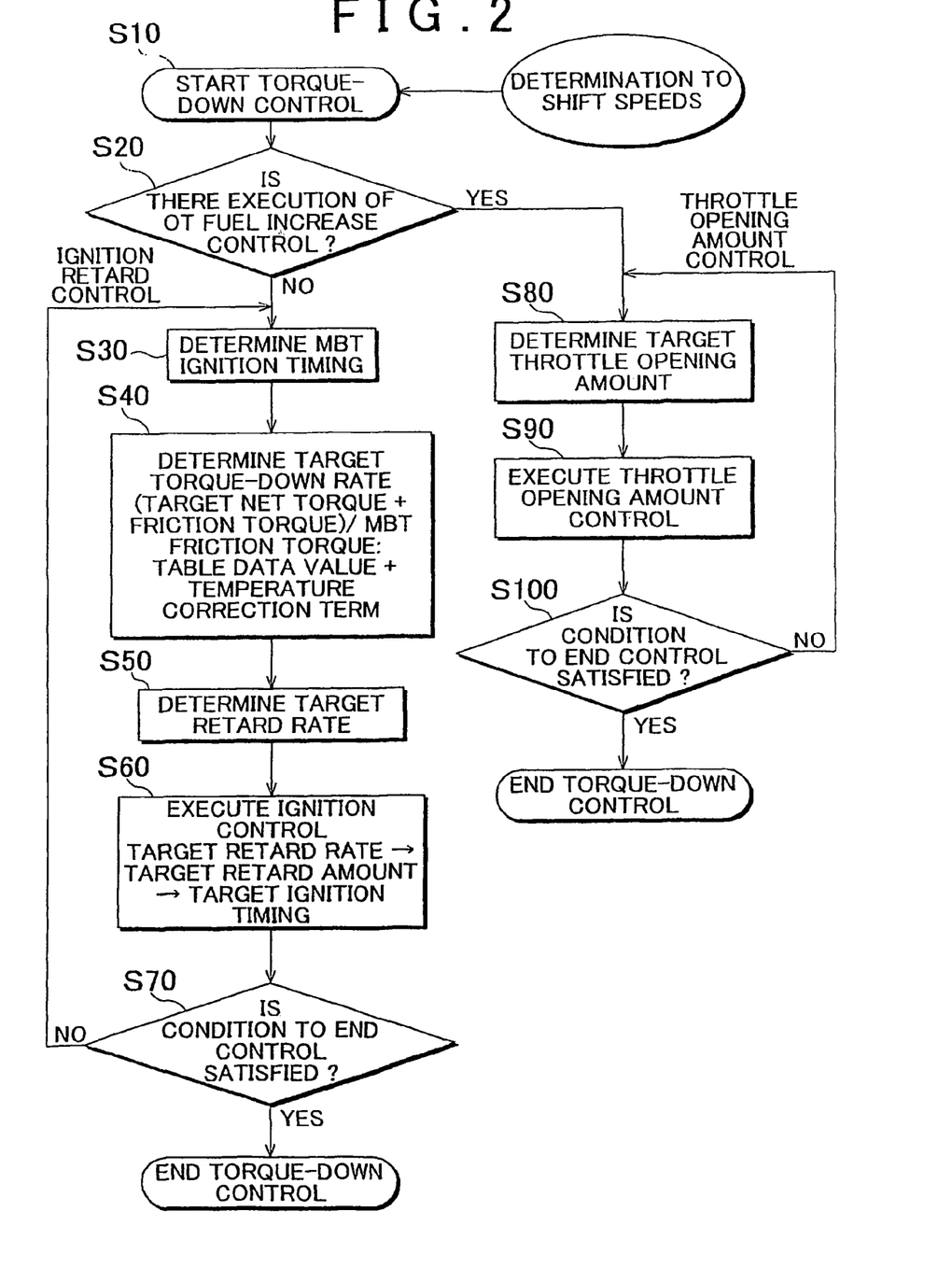
FIG. 2 is a flowchart of torque-down control during shifting according to the example embodiment of the invention.

FIG. 2 is a flowchart illustrating an example of torque-down control during shifting according to this example embodiment of the invention. As shown in the drawing, the torque-down control during shifting starts to be executed in response to a determination to shift speeds of the transmission (step S10). First, the temperature of the catalytic converter 20 is estimated and it is determined whether there is a possibility that OT fuel increase control will be executed and whether OT fuel increase control is already being executed (step S20).

The temperature of the catalytic converter 20 may be estimated by a known method such as a table look-up method using a two-dimensional data table (a table of the format illustrated in FIG. 3A) of catalytic converter temperatures with the engine speed and intake air amount as variables, which was prepared in advance through experimentation, for example. Alternatively, whether or not execution of OT fuel increase control is being executed or the possibility of OT fuel increase control being executed may also be determined directly (without calculating an estimated value for the temperature of the catalytic converter) with the engine speed and intake air amount as the variables. If it is highly likely that OT fuel increase control will be executed or if OT fuel increase control is already being executed, torque-down control is executed by throttle opening amount control. On the other hand, if it is not highly likely that OT fuel increase control will be executed or if OT fuel increase control is not already being executed, torque-down control is executed by ignition timing retard control.

When the torque is to be reduced by ignition timing retard control, the MBT ignition timing (step S30) and the target torque-down rate (step S40) are both determined.

Figure 3A:
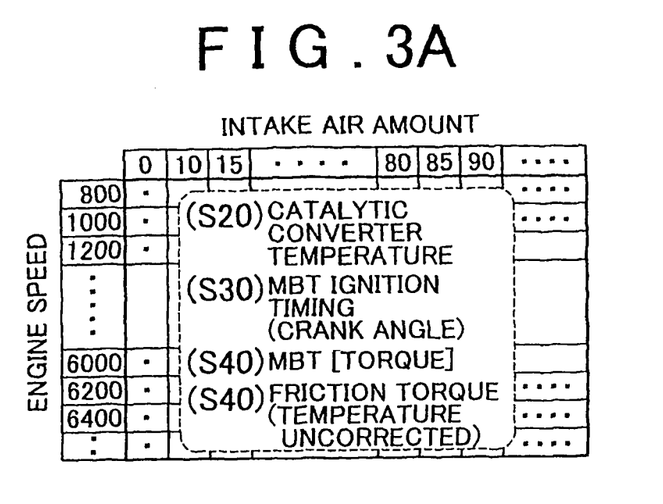
FIG. 3A is a two-dimensional data table used to estimate the catalyst temperature in step S20 in FIG. 2, the MBT ignition timing in step S30 in FIG. 2, and the MBT and friction torque in step S40 in FIG. 2.

The MBT ignition timing may be determined by the table look-up method using the two-dimensional data table of the format illustrated in FIG. 3A of MBT ignition timings (unit: crank angle), which has the engine speed and the intake air amount as the variables and was prepared in advance through experimentation. It is to be understood that if there is no data specified by the current engine speed and intake air amount in the table when determining the value of the MBT ignition timing, the value of the MBT ignition timing may be determined by interpolation using values in the data table as appropriate.

The target torque-down rate is determined by the following expression.

target torque-down rate=(target net torque+friction torque)/MBT

Here, the denominator "MBT" in the above expression is the torque that should be generated in the engine by the combustion of fuel when ignition occurs at the MBT ignition timing. The numerator in the above expression is the torque that should be generated in the engine by the combustion of fuel, which has been reduced by torque-down control, i.e., it is the target torque. Normally in torque-down control during shifting, however, a target value of the torque to be transmitted from the output shaft of the engine to the transmission after torque-down control is performed, i.e., a target net torque, is provided which does not include the amount of torque consumed by friction between elements of various parts of the engine, i.e., friction torque. Thus, as described above, the target torque is provided by the target net torque+friction torque.

In the foregoing target torque-down rate expression, MBT may be estimated based on the engine speed and the intake air amount, just like the MBT ignition timing (the two-dimensional table illustrated in FIG. 3A may be used). The target net torque is determined by a suitable method based on information indicative of the engine speed, the throttle opening amount, and the transmission speeds before and after shifting, to eliminate the effect from the rotary inertia torque of the engine before and after shifting.

Figure 3B:
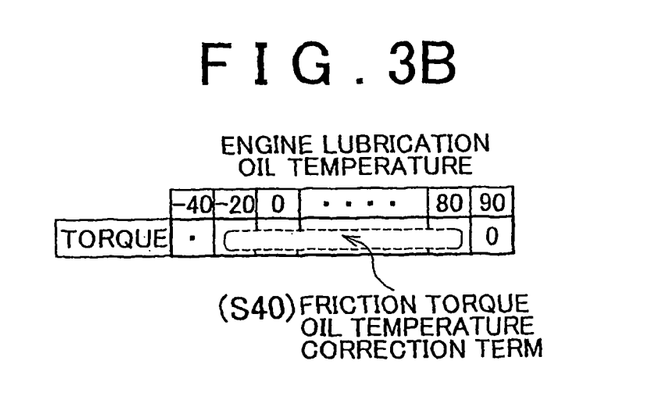
FIG. 3B is a one-dimensional data table used to determine a temperature correction term for the friction torque in step S40.

The friction torque is normally estimated by the table look-up method using a two-dimensional data table of the format illustrated in FIG. 3A which has the engine speed and the intake air amount as the variables and was prepared in advance through experimentation. The friction between elements in an actual engine, however, is affected by the temperature inside the engine. Accordingly, in this example embodiment, the friction torque is corrected by adding a temperature correction component, in which the temperature of the lubrication oil of the engine is a parameter, to the torque value determined by the two-dimensional data table. That is, the friction torque is given by the table data value+the temperature correction term. The temperature correction term of the friction torque may be determined by a table, as illustrated in FIG. 3B, with a measurement value from the oil temperature sensor 28 as a parameter, and may be obtained by interpolation using data in the table as appropriate when the current oil temperature value is not in the table.

The MBT may be provided by the current net engine torque+the amount that the torque is reduced from the current MBT+the friction torque. Accordingly, instead of estimating the MBT directly from the engine speed and the intake air amount (more specifically, when engine control other than the torque-down control of this example embodiment is performed and the MBT is unable to be obtained with sufficient accuracy from the engine speed and the intake air amount), the MBT may be indirectly obtained using the current net engine torque measured by a suitable torque sensor, not shown, provided on the output shaft of the engine, the current torque-down amount obtained by an arbitrary method by the difference between the current ignition timing and the MBT ignition timing and a parameter indicative of another operating state of the engine, and the friction torque that was temperature corrected.

Figure 3C:
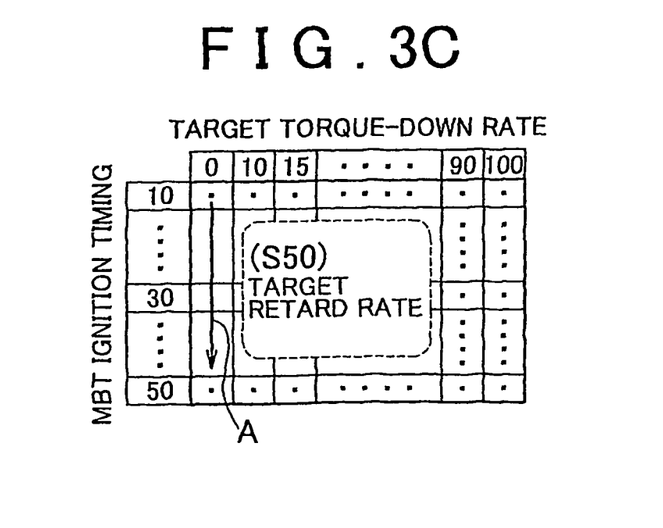
FIG. 3C is a two-dimensional data table used to determine a target retard rate in step S50.

When the MBT ignition timing and the target torque-down rate are determined, a target retard rate is then determined by the table look-up method using a two-dimensional data table of the format illustrated in FIG. 3C of retard rates which has the determined MBT ignition timing and target torque-down rate as variables and which was prepared in advance through experimentation (step S50). As described above, the retard rate that achieves a given target torque-down rate changes substantially linearly with respect to the MBT ignition timing (i.e., changes linearly in the direction of arrow A in the drawing). Therefore, it is to be understood that a more accurate target retard rate is determined by linear interpolation even if the intervals between MBT ignition timing values in the data table are larger than usual.

Figure 3D:
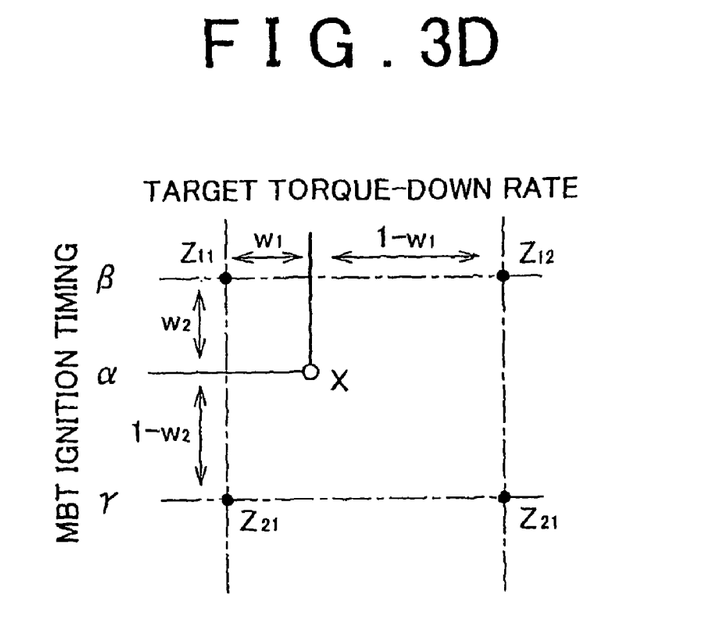
FIG. 3D is a view illustrating a method for determining a target value by interpolation using a plurality of data values in the table.

With linear interpolation of the data, referring to FIG. 3D, for example, when data for points $Z_{11}$ to $Z_{22}$ are provided in the table and the data point specified by the values of the current MBT ignition timing and the target torque-down rate is point X, a retard rate Zx of point X is given by $$Zx = w_1 w_2 Z_{22} + (1-w_1) w_2 Z_{21} + w_1 (1-w_2) Z_{12} + (1-w_1)(1-w_2) Z_{11}$$

In this expression, $Z_{11}$ to $Z_{22}$ are data values of retard rate units (%), $w_1$ is the ratio of the difference in the torque-down rate from point $Z_{11}$ to point X to the difference in the torque-down rate between point $Z_{11}$ and point $Z_{12}$, and $w_2$ is the ratio of the difference in the MBT ignition timing from point $Z_{11}$ to point X to the difference in the MBT ignition timing between point $Z_{11}$ and point $Z_{12}$.

Thus, if the target retard rate is provided, the target retard amount from the MBT ignition timing can be obtained by multiplying that target retard rate by the value of the MBT ignition timing. Ignition of the ignition device 16 is then executed using the ignition timing corresponding to that target retard amount as the target ignition timing (step S60).

In step S50, even if the data in FIG. 3C is the retard amount, it is to be understood that the target retard amount can be accurately determined by interpolation using the characteristic in which the retard rate that provides a given torque-down rate changes substantially linearly with respect to the MBT ignition timing by correcting the interpolation method as follows.

$$\alpha Zx = w_1 w_2 Z_{22}/\gamma + (1-w_1) w_2 Z_{21}/\gamma + w_1 (1-w_2) Z_{12}/\beta + (1-w_1)(1-w_2) Z_{11}/\beta$$

In this expression, $Z_{11}$ to $Z_{22}$ are data values of retard amount units, a is the current MBT ignition timing, β is the value of the MBT ignition timing of point $Z_{11}$, and γ is the value of the MBT ignition timing of point $Z_{21}$.

Steps S30 to S60 above are repeatedly executed until a predetermined condition to end the control is satisfied in step S70. In this example embodiment of the invention, the torque-down control by retarding the ignition timing may be ended at the point when the engine speed reaches a target value determined by an arbitrary method during a shift command. This torque-down control may also be ended when the target net torque has become substantially 0.

Figure 3E:
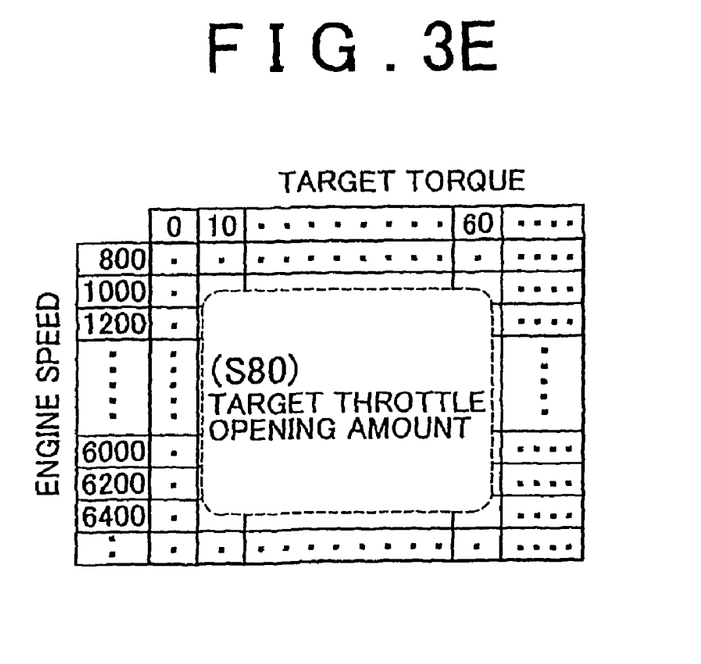
FIG. 3E is a two-dimensional data table for determining a target throttle opening amount in step S80.

Referring back to FIG. 2 again, if torque-down control by throttle opening amount control is selected in step S20, the target throttle opening amount is determined in step S80 by the table look-up method using a two-dimensional table of throttle openings (i.e., a table of the format illustrated in FIG. 3E) with the engine speed and the target torque as variables, which was prepared in advance through experimentation. Based on this, the throttle opening amount control is then executed (step S90). The target torque may be appropriately determined to suppress shift shock by the target net torque +the friction torque, as in the case of the ignition retard control, for example. The control in steps S80 and S90 are repeatedly executed until a condition similar to the condition to end the ignition retard control in step S70 is satisfied in step S100. Regarding the torque-down control according to the opening amount of the throttle, in this example embodiment, the throttle valves are independent throttle valves, one of which is provided for each cylinder, and the responsiveness to an output from throttle opening amount control is good, which is advantageous in that torque-down is performed quickly.

Incidentally, the data values in each of the tables in FIGS. 3A, 3B, 3C, 3D and 3E are experimentally determined in each engine to be used.

Although the invention has been described herein with reference to specific embodiments, many modifications and variations therein will readily occur to those skilled in the art. Accordingly, it is to be understood that the invention is not limited only to those example embodiments described above, but may be applied to various kinds of apparatuses without departing from the spirit of the invention.

The invention claimed is:

1. An engine control apparatus of an engine in which an output shaft is connected to an automatic transmission or a manual transmission with an automatic clutch, comprising:
   an MBT ignition timing determining portion which determines, based on an operating state of the engine, an MBT ignition timing that generates maximum torque in that operating state of the engine;
   a target torque-down rate determining portion that determines a target torque-down rate which is a ratio of a target torque of the engine when a speed of the transmission is changed to the maximum torque;
   a target ignition timing determining portion which determines a target ignition timing for achieving the target torque-down rate based on the MBT ignition timing; and
   an ignition control portion which executes ignition at the target ignition timing;
   wherein the target ignition timing determining portion determines a target retard rate from the MBT ignition timing which will achieve the target torque-down rate and determines the target ignition timing based on the target retard rate.

2. The engine control apparatus according to claim 1, wherein the target ignition timing determining portion determines the target retard rate using a two-dimensional data table of retard rates with the MBT ignition timing and the target torque-down rate as variables.

3. The engine control apparatus according to claim 2, wherein the target retard rate is provided by linearly interpolating a value of a retard rate in the two-dimensional data table.

4. The engine control apparatus according to claim 1, wherein the target torque-down rate determining portion includes:

a maximum torque estimating portion which estimates the maximum torque obtained by the combustion of fuel at the MBT ignition timing;

a friction torque estimating portion which estimates a friction torque of the engine; and a target torque-down rate determining portion which determines the torque-down rate based on the maximum torque, a target net torque to be transmitted from the engine to the transmission when a speed of the transmission is changed, and the friction torque, wherein the friction torque estimating portion corrects the friction torque based on a temperature of lubrication oil of the engine.

5. The engine control apparatus according to claim 1, further comprising:

a fuel increase control determining portion which determines whether to execute a fuel increase control to avoid melting loss of a catalyst provided in an exhaust passage of the engine due to a rise in temperature of exhaust gas in the engine; and a throttle control portion which controls an opening amount of an intake throttle of the engine, wherein, when it is determined that the fuel increase control should be executed, ignition control by the ignition control portion according to the target ignition timing is prohibited, and the throttle control portion reduces the output torque of the engine by controlling the opening amount of the intake throttle.

6. An engine control apparatus of an engine in which an output shaft is connected to an automatic transmission or a manual transmission with an automatic clutch, comprising:

an MBT ignition timing determining portion which determines, based on an operating state of the engine, an MBT ignition timing that generates maximum torque in that operating state of the engine;

a target torque-down rate determining portion that determines a target torque-down rate which is a ratio of a target torque of the engine when a speed of the transmission is changed to the maximum torque;

a target ignition timing determining portion which determines a target ignition timing for achieving the target torque-down rate based on the MBT ignition timing; and an ignition control portion which executes ignition at the target ignition timing, wherein the target ignition timing determining portion has a two-dimensional data table of retard amounts from the MBT ignition timing with the MBT ignition timing and the target torque-down rate as variables, and determines the target ignition timing based on a value provided by linearly interpolating a value obtained by dividing values of a plurality of retard amounts in the two-dimensional data table by respective crank angles of the corresponding MBT ignition timings.

7. An engine control method which controls output torque from an engine in which an output shaft is connected to an automatic transmission or a manual transmission with an automatic clutch, and reduces the output torque when a speed of the transmission is changed, the method comprising the steps of:

determining, based on an operating state of the engine, an MBT ignition timing that generates maximum torque in that operating state of the engine;

determining a target torque-down rate which is a ratio of a target torque of the engine when a speed of the transmission is changed to the maximum torque;

determining a target ignition timing for achieving the target torque-down rate based on the MBT ignition timing; and executing ignition at the target ignition timing, wherein in determining the target ignition timing, a target retard rate from the MBT ignition timing which will achieve the target torque-down rate is determined and the target ignition timing is determined based on the target retard rate.

8. The engine control method according to claim 7, wherein in determining the target ignition timing, the target retard rate is determined using a two-dimensional data table of retard rates with the MBT ignition timing and the target torque-down rate as variables.

9. The engine control method according to claim 8, wherein the target retard rate is provided by linearly interpolating a value of a retard rate in the two-dimensional data table.

10. The engine control method according to claim 7, wherein, in determining the target torque-down rate, the maximum torque obtained by the combustion of fuel at the MBT ignition timing is estimated, a friction torque of the engine is estimated, and the target torque-down rate is determined based on the maximum torque, a target net torque to be transmitted from the engine to the transmission when a speed of the transmission is changed, and the friction torque, and in estimating the friction torque, the friction torque is corrected based on a temperature of lubrication oil of the engine.

11. The engine control method according to claim 7, further comprising the steps of:

determining whether to execute a fuel increase control to avoid melting loss of a catalyst provided in an exhaust passage of the engine due to a rise in temperature of exhaust gas in the engine; and controlling an opening amount of an intake throttle of the engine, wherein when it is determined that the fuel increase control should be executed, ignition control according to the target ignition timing is prohibited, and the output torque of the engine is reduced by controlling the opening amount of the intake throttle.

12. An engine control method which controls output torque from an engine in which an output shaft is connected to an automatic transmission or a manual transmission with an automatic clutch, and reduces the output torque when a speed of the transmission is changed, the method comprising the steps of:

determining, based on an operating state of the engine, an MBT ignition timing that generates maximum torque in that operating state of the engine;

determining a target torque-down rate which is a ratio of a target torque of the engine when a speed of the transmission is changed to the maximum torque;

determining a target ignition timing for achieving the target torque-down rate based on the MBT ignition timing; and executing ignition at the target ignition timing, wherein in determining the target ignition timing, the target ignition timing is determined based on a value provided by linearly interpolating a value obtained by dividing values of a plurality of retard amounts in a two-dimensional data table of retard amounts from the MBT ignition timing with the MBT ignition timing and the target torque-down rate as variables by respective crank angles of the corresponding MBT ignition timings.

* * * * *

UNITED STATES PATENT AND TRADEMARK OFFICE
CERTIFICATE OF CORRECTION

PATENT NO. : 7,530,922 B2  Page 1 of 1
APPLICATION NO. : 11/596038
DATED : May 12, 2009
INVENTOR(S) : Masakatsu Nagai It is certified that error appears in the above-identified patent and that said Letters Patent is hereby corrected as shown below:

| Column | Line | |
|---|---|---|
| 11 | 57 | After "units," change "a" to --α--. |

Signed and Sealed this

Eighteenth Day of August, 2009

David J. Kappos
*Director of the United States Patent and Trademark Office*